(12) United States Patent
Leu

(10) Patent No.: US 6,663,269 B1
(45) Date of Patent: Dec. 16, 2003

(54) LIGHTED EXHAUST PIPE EXTENSION

(75) Inventor: Carl W. Leu, Miami, FL (US)

(73) Assignee: Poli-Auto, Inc., Miami, FL (US)

( * ) Notice: Subject to any disclaimer, the term of this patent is extended or adjusted under 35 U.S.C. 154(b) by 0 days.

(21) Appl. No.: 10/196,578

(22) Filed: Jul. 17, 2002

(51) Int. Cl.7 .................................................. B60Q 1/00
(52) U.S. Cl. ........................ 362/487; 362/459; 362/473; 362/545; 362/96
(58) Field of Search ................................. 362/459, 473, 362/487, 545, 96

(56) References Cited

U.S. PATENT DOCUMENTS 5,390,092 A * 2/1995 Lin ............................ 362/235
6,471,377 B1 * 10/2002 Stegall ....................... 362/487
6,491,418 B1 * 12/2002 Chen .......................... 362/487

* cited by examiner

Primary Examiner—Sandra O'Shea
Assistant Examiner—Jacob Y. Choi
(74) Attorney, Agent, or Firm—Rothwell, Figg, Ernst & Manbeck

(57) ABSTRACT

A lighted extension for an exhaust pipe is provided which has an elongated substantially cylindrical collar including a first portion disposed coaxially around an exhaust pipe and a second portion that extends beyond an exhaust pipe end of the exhaust pipe. A plurality of fasteners is disposed substantially radially around a circumference of the first portion to secure the collar to the exhaust pipe. A cap with a plurality of lights displayably disposed in the cap is removably disposed over an end of the second portion. A perforation disposed in a wall of the second portion, communicating with the exhaust pipe, allows exhaust diverted by a baffle disposed within the second portion medially between the perforation and the cap to pass through the perforation, substantially avoiding the lights.

11 Claims, 6 Drawing Sheets

LIGHTED EXHAUST PIPE EXTENSION

BACKGROUND OF THE INVENTION

1. Field of the Invention

The invention relates to an extension for an exhaust pipe, and particularly to an extension for an exhaust pipe with lights incorporated therein.

2. Description of the Related Art

Owners of automobiles may want to customize their vehicles by applying personalized decorative touches. Decorations may include such things as chrome plated or aluminum anodized engine or chassis components, lights attached to various locations on the vehicle body, customized body panels, and so on. Some of these decorations are more permanent than others, particularly if they are difficult to remove, or take considerable time and effort to install. An example of an effort-intensive installation is the above-mentioned chrome plating. The tastes of owners of automobiles may be fickle, however, so it would be desirable if vehicle decorations were relatively easy to install and remove. It also may be desirable for decorations to be easily removed at the time the vehicle is sold, since a prospective buyer may not share the vehicle owner's tastes. It may also be desirable to be able to install a decorative item before, e.g. a Saturday night spent cruising the local strip, and then remove the decorative item before driving the vehicle to work or school;on Monday.

Exhaust pipes customarily protrude from the rear of an automobile, and thus offer a highly visible location for decorative effects to be installed on an automobile. Some examples of decorative effects on exhaust pipes are chrome plated exhaust pipes, exhaust pipe extenders, larger-diameter exhaust pipes, and so on.

One technique of decorating cars in general, and exhaust pipes in particular, is to incorporate a light or a collection of lights in the exhaust pipe. Such lights may be, e.g. incorporated in the end of the exhaust pipe, or in a collar-like extender fitted over the end of the exhaust pipe, so that the lights are visible to those behind the vehicle. Lights may be, e.g. arranged in a ring around an inner circumference of an exhaust pipe or an exhaust pipe extender. Lights arranged around an inner circumference of an extender, however, may not be easily visible from a corner or a side of the vehicle. If such lights were, for example, recessed in the extender, the walls of the extender may block the view of an observer on the corner of the vehicle. It would be desirable to place a light in the center of an exhaust pipe extender, so that even if it were recessed, it may be substantially visible to those at the corner of the vehicle.

Since lighted exhaust pipe extenders may have a ring of lights arranged around an inner circumference of an exhaust pipe extender, exhaust gases passing through such extenders on their way to the atmosphere may obscure the lights. This is true especially if the engine is not tuned, or is not running efficiently. Engines that aren't running efficiently often emit blue or black smoke, which may block the light. Even exhaust gases of tuned engines may absorb certain wavelengths of light, and transmit others, thus changing the color of the lights as seen by an observer. It would be desirable if the flow of exhaust were substantially diverted before it reached the lights, so that the lights would not be subjected to the stream of exhaust, thereby maintaining their brightness and attractiveness.

Exhaust gases passing through such extenders on their way to the atmosphere may also coat the lights with the products of combustion from the engine, lubricating oil, and so on. Products of combustion may be, for example, water and unburned hydrocarbons, along with oxides of nitrogen. Such chemicals may be corrosive. Furthermore, placing the lights in the stream of the exhaust reduces the lifespan of the lights, since the heat and moisture from the exhaust degrades the lights and their electrical connections. It would be desirable if the flow of exhaust were substantially diverted before reaching the lights, so that the lights would be protected from the stream of exhaust, thereby increasing their longevity.

SUMMARY OF THE INVENTION

In one embodiment, a lighted extension for an exhaust pipe is provided which has an elongated substantially cylindrical collar including a first portion disposed coaxially around an exhaust pipe and a second portion that extends beyond an exhaust pipe end of the exhaust pipe. A plurality of fasteners is disposed substantially radially around a circumference of the first portion to secure the collar to the exhaust pipe. A cap with a plurality of lights displayably disposed in the cap is removably disposed over an end of the second portion. A perforation disposed in a wall of the second portion, communicating with the exhaust pipe, allows exhaust diverted by a baffle disposed within the second portion medially between the perforation and the cap to pass through the perforation, substantially avoiding the lights.

DETAILED DESCRIPTION OF THE SEVERAL VIEWS OF THE DRAWINGS

Figure 1:
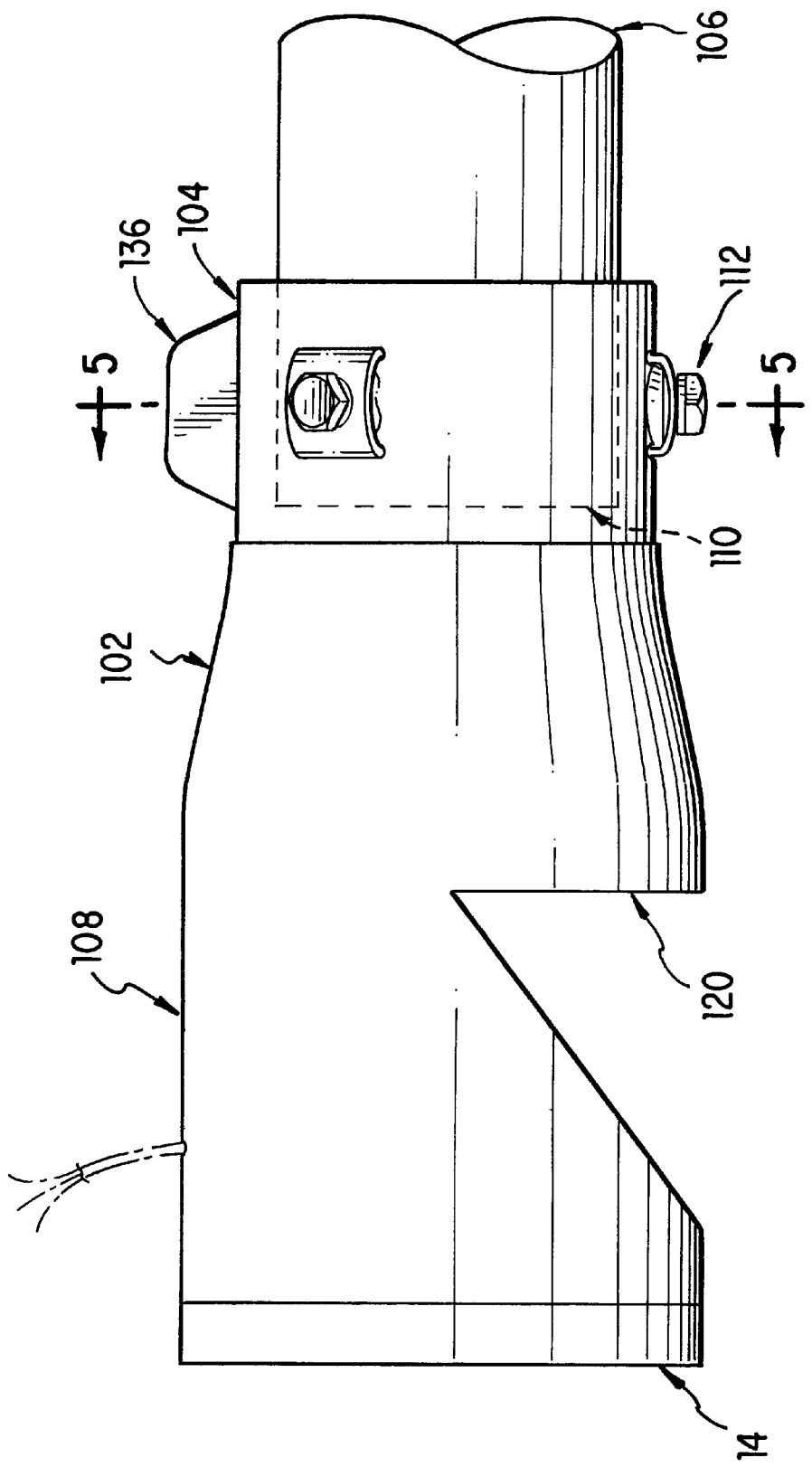
FIG. 1 shows a side view of the exhaust pipe extender according to one embodiment of the invention.

In FIG. 1 is shown an exhaust pipe extender 100 according to a first embodiment of the invention. Exhaust pipe extender 100 may be seen to consist of an elongated substantially cylindrical collar 102 having a first portion 104 disposed coaxially around an exhaust pipe 106, and a second portion 108 extending beyond an exhaust pipe end 110 of exhaust pipe 106. Collar 102 may be made of, e.g. steel, such as coated, chrome- or tin-plated, or galvanized steel, aluminum, such as anodized aluminum, brass and other alloys of copper, or ceramics, including coated ceramics. Collar 102 may have, e.g. an inner diameter that is slightly larger than the outer diameter of exhaust pipe 106. Since exhaust pipe diameters are relatively standardized, collar 102 may be made in several standard diameters as well. In a preferred embodiment, collar 102 may be made in one diameter that is large enough to fit over the largest standard diameter exhaust pipe, or some significant percentage of commercially available exhaust pipes.

Figure 2A:
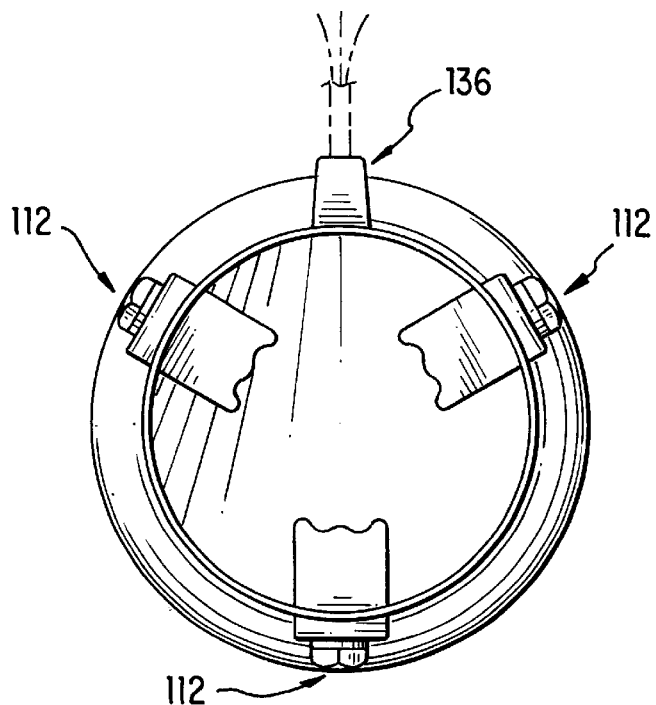
FIG. 2 shows a front and a rear view of the exhaust pipe extender according to the embodiment of FIG. 1.
Figure 5:
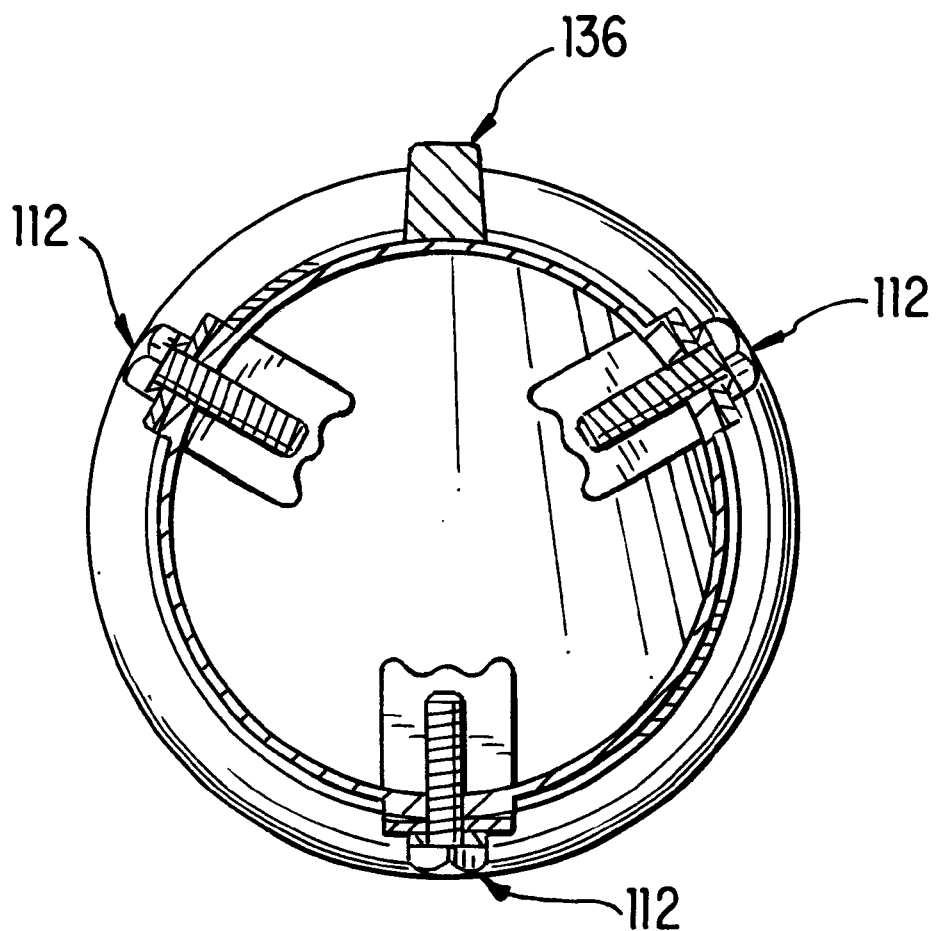
FIG. 5 shows a view through section 5—5 in FIG. 1.

A plurality of fasteners 112 is disposed substantially radially around a circumference of first portion 104 to secure collar 102 to exhaust pipe 106, as shown in FIGS. 2A and 5.

Fasteners may be, e.g. a brackets, set screws, magnets, rivets, darts, indentations, weldments, or bolts. In one embodiment, three fasteners 112 are arranged at 120° angles around the circumference of collar 102. Set screws may be used to, e.g. adjust collar 102 to fit over various sizes of exhaust pipes. Simply turning the set screws down further may accommodate exhaust pipes of smaller diameters. The set screws may contact an outer surface of the exhaust pipe directly, or they may, in the alternative, adjust a height of, e.g. a bracket that contacts the surface of the exhaust pipe. The tips of the set screws may be made in, e.g. a chisel point to dig into the surface of the exhaust pipe and attach collar 102 more securely. Collar 102 could be removed and reinstalled by simply loosening the set screws and sliding collar 102 over exhaust pipe 106. The location of collar 102 along the length of exhaust pipe 106 may also be adjusted by simply loosening the set screws and sliding collar 102 over exhaust pipe 106.

Darts and indentations might also be used to install collar 102. A tool such as a center punch or a clamp with internal sharp protrusions could be used to form darts or indentations in both the collar and the exhaust pipe while the collar is fitted over the exhaust pipe.

Figure 2B:
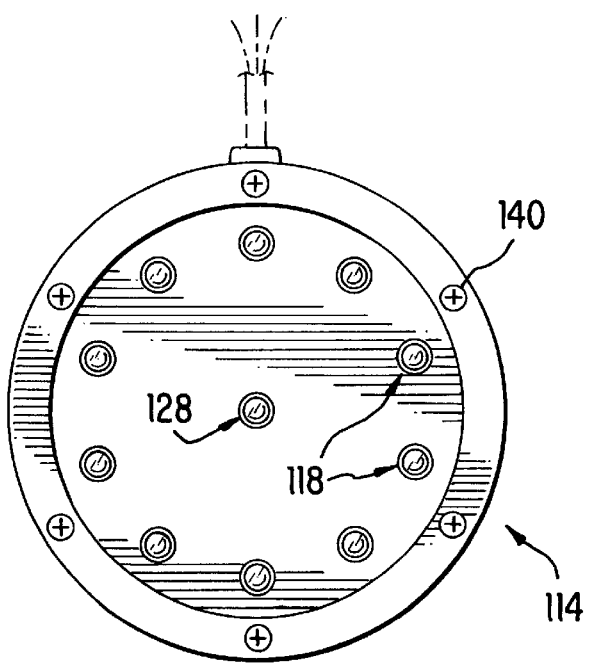
Figure 4:
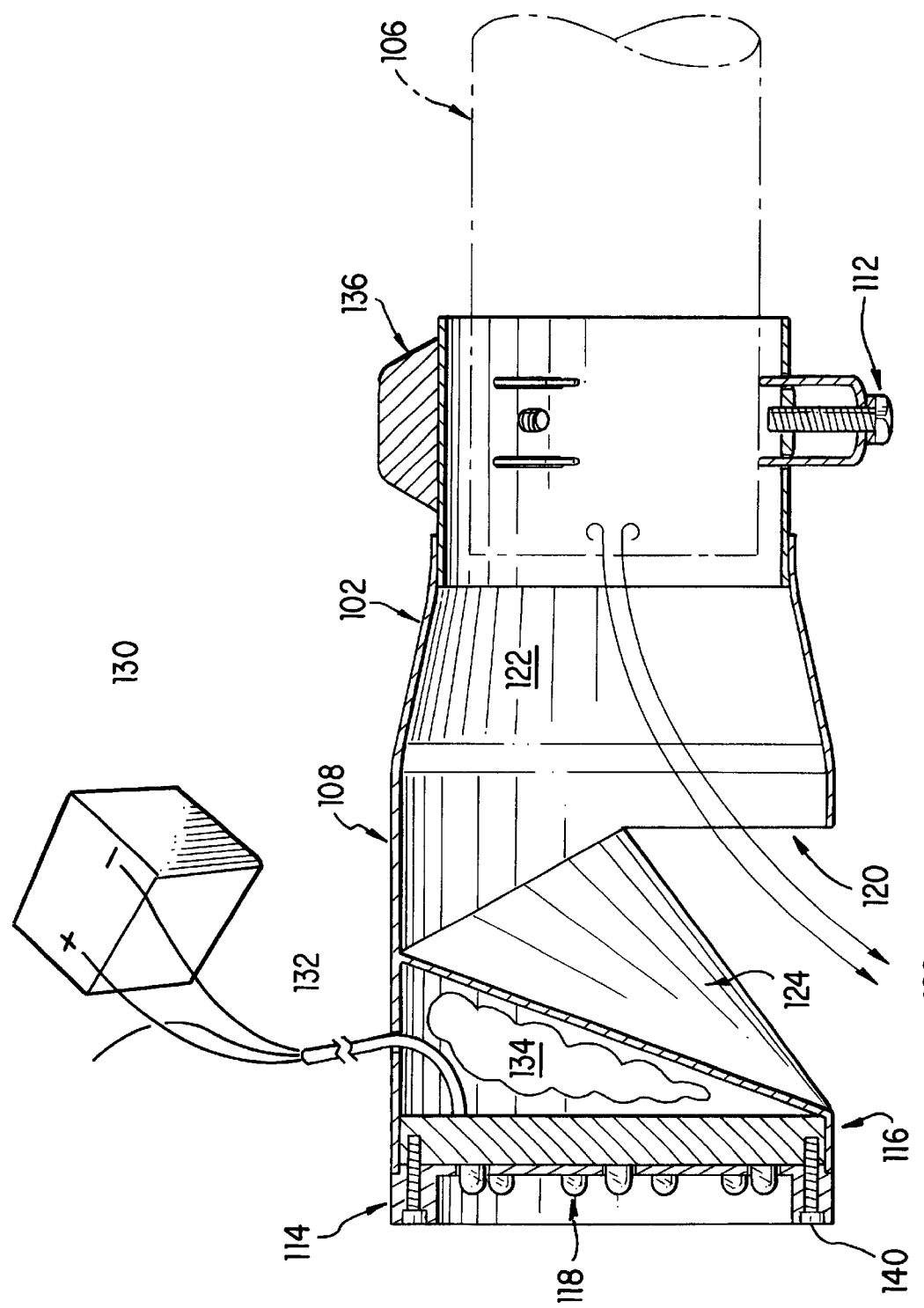
FIG. 4 shows a view through section 4—4 in FIG. 3.
Figure 6:
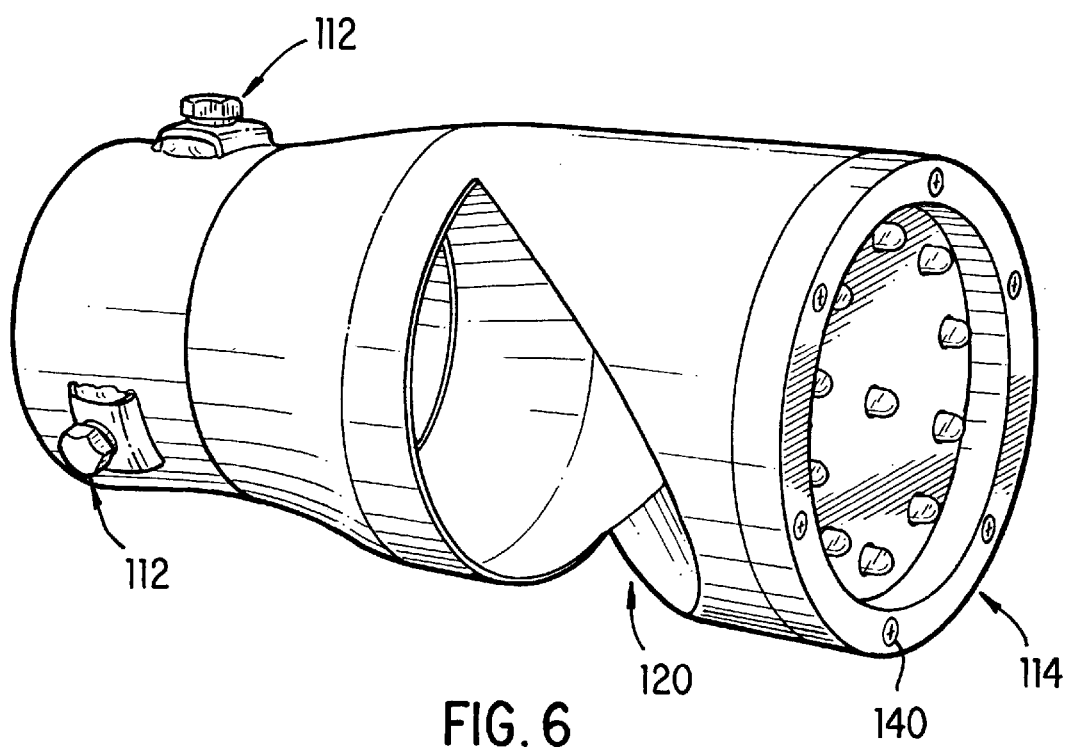
FIG. 6 shows a three-quarter view of the exhaust pipe extender according to the embodiment of FIG. 1.

A cap 114 may be removably disposed over an end 116 of second portion 108 as shown in FIGS. 2B, 4, and 6. Cap 114 may be, e.g. threaded into end 116, or pressed into end 116. In one embodiment, an inner wall of end 116 and the outer surface of cap 114 are tapered in a complimentary manner such that they mate when cap 114 is installed in end 116. The tangent of the angle of taper is made to be substantially greater than a coefficient of friction of the mating surfaces, in the manner of a so-called 'Morse Taper'. Cap 114 will thus remain stuck in end 116 until a force sufficient to overcome the friction between the mating surfaces nudges it out. In another embodiment, a plurality of fasteners 140 may be arranged around a circumference of cap 114 to secure cap 114 to end 116.

Cap 114 may be made of, e.g. steel, such as coated, chrome- or tin-plated, or galvanized steel, aluminum, such as anodized aluminum, brass and other alloys of copper, or ceramics, including coated ceramics. A plurality of lights 118 may be displayably disposed in cap 114. In one embodiment, lights 118 are disposed substantially radially around a circumference of cap 114. In another embodiment, one or several of lights 118 may be disposed substantially in a center 128 of cap 114. Lights 118 may be, e.g. light emitting diodes (LEDs), neon lights, incandescent lights, liquid crystal displays, or fluorescent lights. Neon in this case is a generic term for lights formed by filling transparent tubes with an inert gas, such as, e.g. argon, neon or xenon, and energizing them. In a preferred embodiment, cap 114 may be removed to replace lights 118.

A source of electricity 130 may be connected via a circuit 132 to lights 118 to supply electricity to lights 118, as shown in FIG. 4. Source of electricity 130 may be, e.g. a battery, an alternator, or a generator. Circuit 132 may be, e.g. carried on a wire or a pair of wires running from lights 118 to a battery of the vehicle. In the case of a single wire, circuit 132 may be grounded appropriately to some ground in the neighborhood of lights 132. In one embodiment, lights 118 are lit substantially continuously. In another embodiment, lights 118 are lit substantially sequentially. The sequence may be a pattern, or it may appear to be random to an observer. The sequence may be controlled by, e.g. a small integrated circuit or a timer.

In one embodiment, circuit 132 may be, e.g. composed of three wires, a first and second control wires, and a neutral, return, or ground wire. A signal, which may be a power signal, asserted on the first control wire may make all of lights 118 light up, while a signal asserted on the second control wire may make lights 118 flash in sequence, such as, e.g. alternating between a clockwise and a counter-clockwise rotation.

A perforation 120 may be disposed in a wall 122 of second portion 108 so that perforation 120 communicates with exhaust pipe 106, as shown in FIGS. 1 and 4. A baffle 124 may be disposed within second portion 108 medially between perforation 120 and cap 114 as shown in FIG. 4. Baffle 124 substantially diverts a stream of exhaust 126 toward perforation 120 such that exhaust 126 passes through perforation 120, substantially avoiding lights 118. In one embodiment, perforation 120 is on the underside of collar 102.

Collar 102 need not be sealed around exhaust pipe 106. Collar 102 need only be relatively larger than the hole in exhaust pipe 106, such that a substantial amount of exhaust 126 is collected by collar 102 and diverted by baffle 124. Airflow underneath the vehicle due to, e.g. vehicle motion will serve to augment collar 102 in collecting exhaust 126.

Figure 3:
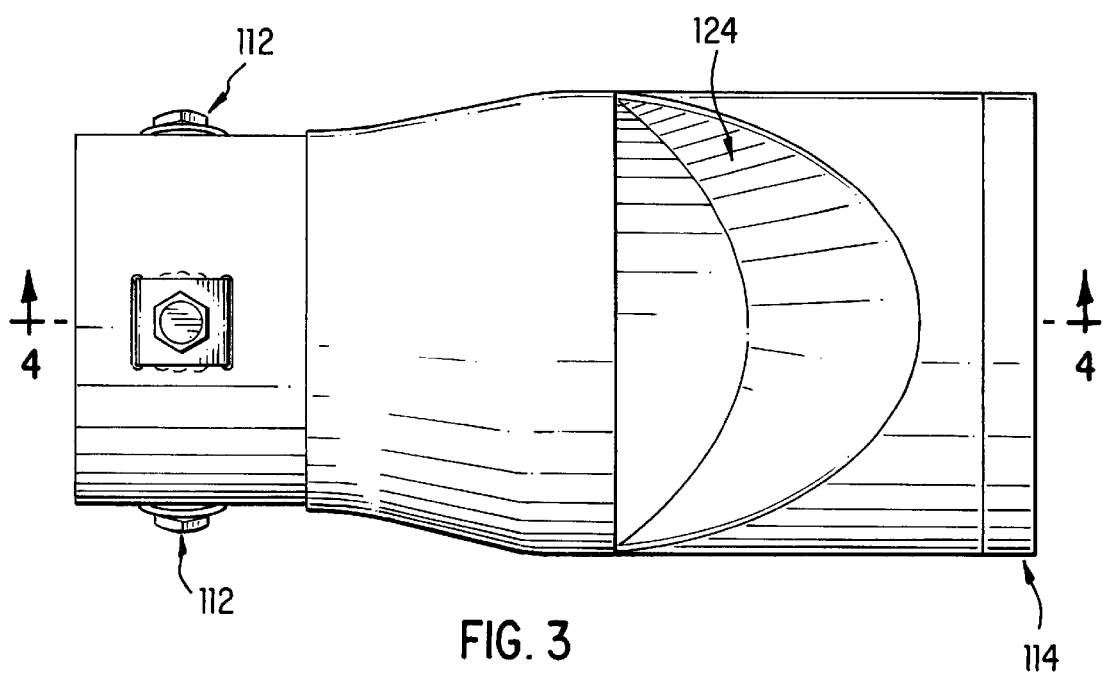
FIG. 3 shows a bottom view of the exhaust pipe extender according to the embodiment of FIG. 1.

In one embodiment, baffle 124 extends across the entire width of collar 102, as shown in FIG. 3. Baffle 124 thus substantially prevents exhaust 126 from reaching cap 114 and lights 118. Baffle 124 may be made of, e.g. steel, such as coated, chrome- or tin-plated, or galvanized steel, aluminum, such as anodized aluminum, brass and other alloys of copper, or ceramics, including coated ceramics.

Even though exhaust 126 is diverted by baffle 124 before reaching cap 114 and lights 118, heat from exhaust 126 may be conducted by baffle 124 and radiated toward cap 114 and lights 118. In one embodiment, insulation 134 may be disposed inside collar 102, between baffle 124 and cap 114 to protect them from the heat associated with exhaust 126, as shown in FIG. 4. Insulation 134 may be made of, e.g. foam, fiberglass, glass, phenolic, silicone, carbon, graphite, silica, ceramic, or silicon carbide. Insulation 134 may thus prevent the heat associated with exhaust 126 from reaching cap 114 and lights 118.

In an alternative embodiment, a fin 136 may be disposed radially outward from a surface 138 of second portion 108 to substantially radiate heat from exhaust 126 before it reaches cap 114 and lights 118, as shown in FIGS. 1, 2A, 4 and 5. Although one fin 136 is shown, a plurality of fins may be used to the same effect. In a preferred embodiment, fin 136 is aligned with the predominant direction of airflow over second portion 108, such as, e.g. in the direction of vehicle motion. In a further alternative embodiment, fin 136 may be a heat sink that absorbs substantially the heat from exhaust 126 before it reaches cap 114 and lights 118.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An exhaust pipe extender comprising:
   an elongated substantially cylindrical collar having a first portion disposed coaxially around an exhaust pipe and a second portion extending beyond an exhaust pipe end of said exhaust pipe;
   a plurality of fasteners disposed substantially radially around a circumference of said first portion to secure said collar to said exhaust pipe;

a cap removably disposed over an end of said second portion;

a plurality of lights displayably disposed in said cap;

a perforation disposed in a wall of said second portion, said perforation communicating with said exhaust pipe;

a baffle disposed within said second portion medially between said perforation and said cap;

wherein said baffle substantially diverts a stream of exhaust toward said perforation such that said exhaust passes through said perforation, substantially avoiding said lights.

2. The exhaust pipe extender of claim 1, wherein said lights are selected from the group consisting of:

LEDs, neon lights, incandescent lights, liquid crystal displays, and fluorescent lights.

3. The exhaust pipe extender of claim 1, wherein said lights comprise further a circuit including a source of electricity, said source of electricity supplying electricity to said lights.

4. The exhaust pipe extender of claim 3, wherein said source of electricity is selected from the group consisting of:

a battery, an alternator, and a generator.

5. The exhaust pipe extender of claim 1, comprising further insulation disposed between said baffle and said cap.

6. The exhaust pipe extender of claim 5, wherein said insulation is selected from the group consisting of:

foam, fiberglass, glass, phenolic, silicone, carbon, graphite, silica, ceramic, and silicon carbide.

7. The exhaust pipe extender of claim 1, comprising further a fin disposed radially outward from a surface of said second portion to radiate heat.

8. The exhaust pipe extender of claim 1, wherein one of said lights is disposed substantially in a center of said cap.

9. The exhaust pipe extender of claim 1, wherein said lights are lit substantially continuously.

10. The exhaust pipe extender of claim 1, wherein said lights are lit substantially sequentially.

11. The exhaust pipe extender of claim 1, wherein said fasteners are selected from the group consisting of:

brackets, set screws, magnets, rivets, darts, indentations, weldments, and bolts.

* * * * *